(12) United States Patent
Ludwig et al.

(10) Patent No.: US 7,431,003 B2
(45) Date of Patent: Oct. 7, 2008

(54) SHEATHED-ELEMENT GLOW PLUG HAVING AN ELASTICALLY MOUNTED GLOW ELEMENT

(75) Inventors: Thomas Ludwig, Gerlingen (DE); Andreas Reissner, Stuttgart (DE); Oliver Glock, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/593,434

(22) PCT Filed: Jan. 17, 2005

(86) PCT No.: PCT/EP2005/050173
§ 371 (c)(1),
(2), (4) Date: May 17, 2007

(87) PCT Pub. No.: WO2005/090865
PCT Pub. Date: Sep. 29, 2005

(65) Prior Publication Data
US 2007/0209624 A1    Sep. 13, 2007

(30) Foreign Application Priority Data
Mar. 16, 2004    (DE) ................. 10 2004 012 673

(51) Int. Cl.
*F23Q 7/22*    (2006.01)
(52) U.S. Cl. .................................. 123/145 A
(58) Field of Classification Search ............ 123/143 B, 123/143 C, 145 R, 145 A; 73/116, 118.1
See application file for complete search history.

(56) References Cited

U.S. PATENT DOCUMENTS

| | | | |
|---|---|---|---|
| 4,620,511 A | 11/1986 | Brooks et al. | |
| 4,682,008 A | 7/1987 | Masaka et al. | |
| 6,823,738 B1* | 11/2004 | Wlodarczyk et al. | 73/705 |
| 7,032,438 B2* | 4/2006 | Heinzelmann et al. | 73/115 |
| 2005/0061063 A1* | 3/2005 | Haussner et al. | 73/116 |
| 2006/0053875 A1* | 3/2006 | Haussner et al. | 73/116 |
| 2007/0245806 A1* | 10/2007 | Hirose et al. | 73/35.13 |

FOREIGN PATENT DOCUMENTS

| | | |
|---|---|---|
| EP | 1 096 141 | 5/2001 |
| EP | 1 281 915 | 2/2003 |
| EP | 1 517 086 | 3/2005 |
| JP | 2001124336 | 5/2001 |
| JP | 2006-10306 | * 1/2006 |
| JP | 2007-78330 | * 3/2007 |
| WO | WO 83/01093 | 3/1983 |
| WO | WO 97/09567 | 3/1997 |

* cited by examiner

*Primary Examiner*—Hai H Huynh
(74) *Attorney, Agent, or Firm*—Kenyon & Kenyon LLP

(57) ABSTRACT

The present invention relates to a sheathed-element glow plug (1) for an internal combustion engine, essentially made up of a plug shell (2) and a glow element (3) that is electrically connected to the plug shell (2), as well as an integrated pressure sensor.

The sheathed-element glow plug (1) has at least one elastic element (4; 204, 204'; 304) that is situated between the inner surface (10) of the plug shell (2) and the glow element (3), this element forming an electrical contact both to a part of the inner surface (10) of the plug shell (2) and to a part of the glow element surface (7), and this element being deformable when a force acts on the glow element (3), and this element permitting a relative movement between the glow element (3) and the shell (2).

8 Claims, 5 Drawing Sheets

SHEATHED-ELEMENT GLOW PLUG HAVING AN ELASTICALLY MOUNTED GLOW ELEMENT

The present invention relates to a sheathed-element glow plug made up essentially of a plug shell and a glow element that is connected electrically to the plug shell, as well as an integrated pressure sensor.

BACKGROUND INFORMATION

For good starting and warmup behavior at low temperatures, diesel engines require a heat source that preheats either the gas mixture, the intake air, or the combustion chamber. For engines in passenger vehicles, as a rule the use of sheathed-element glow plugs is recommended. These are made up of a plug shell and a glow element that protrudes from the glow shell and that, in its assembled state, extends into the combustion chamber of an internal combustion engine. As a rule, the glow elements of the sheathed-element glow plugs extend 4 mm into the combustion chamber of the internal combustion engine, and heat the diesel fuel-air mixture. The glow temperature and post-glow time of the glow element has a significant influence on the exhaust gas behavior, the fuel consumption of the engine, and the idling behavior after starting.

In order to achieve the goals of conserving more fuel and reducing emissions, there is an increasing interest in developing economical sensors that are able to supply information about the combustion behavior of the engine directly from the engine's combustion chamber. Based on this information, it could be possible, for example, to regulate the injected fuel quantity. Monitoring the pressure inside the combustion chamber would have significant advantages in comparison with, for example, ionic current measuring, which supplies only local information, because the pressure measurement values, or the changes in these values, are larger and are therefore easier to acquire.

Integrated sensor designs, in which a pressure sensor is situated on or in the sheathed-element glow plug, have the advantage that it is not necessary to provide an additional bored hole in the internal combustion engine. This advantage is all the greater in modern internal combustion engines, in which the constructive space for mounting additional sensors is very limited.

In the prior art, solutions have been proposed in which a piezoelectric element is provided between the housing and the screw connection on the cylinder of a sheathed-element glow plug, as known for example from EP A 1 096 141 A. In addition, in the document WO 97 09 567 A, an additional pressure sensor in the sheathed-element glow plug is proposed that is connected intermediately, between a fixing element and an element for receiving cylinder pressure, in a body of a sheathed-element glow plug.

According to the prior art, in sheathed-element glow plugs glow elements are pressed together fixedly with the plug shell, in order to ensure a good ground coupling and sealing.

A sensor mounted inside the sheathed-element glow plug has the task of acquiring the minimum change of length (which is in the µm range) when high pressure is applied; a piezosensor can be used for this purpose.

OBJECT OF THE INVENTION

The object of the present invention is to further develop a sheathed-element glow plug having an integrated pressure sensor in such a way as to enable a clear measurement with a satisfactory signal/noise ratio.

ATTAINMENT OF THE OBJECTIVE

This object is achieved in that at least one elastic element is provided that is situated between the inner surface of the plug shell and the glow element, this element forming an electrical contact both to a part of the inner surface of the shell housing and also to a part of the surface of the glow element, and this element being deformable when a force acts on the glow element, and this element allowing a relative movement between the glow element and the shell.

ADVANTAGES OF THE INVENTION

One of the essential advantages of the present invention is that the glow element can execute a macroscopic movement in relation to the shell. The deformation of the conductive elastic element simultaneously ensures that this element is at all times connected both to the glow element and also to the shell, so that the electrical connection is always ensured.

If a force acts on the glow element, for example due to an increase in pressure in the combustion chamber into which the glow element extends, the glow element can move in relation to the shell. This movement is significantly greater than the change in length that the sheathed-element glow plug undergoes under the action of pressure due to its material properties.

Due to this possibility of movement, the glow element is able to transmit the force that it experiences due to the change in pressure in the combustion chamber to a pressure sensor that is integrated in the sheathed-element glow plug or that is connected after the sheathed-element glow plug.

Larger relative movements between the shell and the glow element result in a measurement signal that is acquired more easily, and also result in an optimized signal/noise ratio, and allow the use of many different measurement techniques, because a limitation to the measurement of microscopic quantities is not present.

Preferably, the elastic element has an elasticity that is as free of hysteresis as possible. The relative movement of the glow element therefore does not depend on the direction of the force; rather, the force can be read off directly from the movement of the glow element relative to the plug shell, regardless of whether the pressure in the combustion chamber is increasing or is decreasing.

Copper alloys are examples of a material that has a good electrical conductivity and is elastically deformable while exhibiting a minimal hysteresis of the elastic deformation. In addition, these alloys are also suitable for use as a seal, and are resistant to corrosion.

The calibration of the measurement system to which the glow element itself is to be allocated requires that this glow element again assume its initial position. The elastic element should therefore assume a defined position in relation to the fixed shell.

Preferably, an adjustment of the position of the elastic element takes place via a support inside the shell.

The support surface can face the side of the combustion chamber. During assembly, the elastic element, which preferably has an annular shape, is pressed from the side facing the combustion chamber around the glow element and into the shell; the elastic element can be prevented from sliding out of the shell by crimping.

In an alternative specific embodiment, the support surface faces the connection side of the sheathed-element glow plug. In this case, during assembly the elastic element must be pressed from the connection side around the glow element and into the shell. On the connection side, there takes place an adjustment of the position of the elastic element, preferably via a press ring attached inside the shell.

In an additional, alternative specific embodiment, an adjustment of the position of the elastic element also takes place via welding points attached inside the shell. This fixing is therefore suitable for weldable elastic elements.

The positioning of the elastic element can also be carried out using combinations of the stated fastenings.

Advantageously, it is also possible for the glow element to have at least one radial projection on both sides of which elastic elements are situated. The projection can stand in contact with the shell and can improve the electrical conduction.

The projection results in a deflection of force. While in the case of a pure surface contact between the elastic element and the outer surface of the glow element shear forces are exerted on the elastic element, the force transmitted by the projection onto the elastic element occurs in the axial direction. Moreover, if elastic elements are situated on both sides of the projection, then when there is an axial force on the glow element one of the elastic elements will be compressed and one will be stretched. A possible deviation, caused by hysteresis, of compression and stretching can even itself out in this way.

In another preferred specific embodiment, the elastic element is present in the form of a tension spring element. A tension spring element can further increase the elasticity, because the modulus of elasticity results not only from the material properties but also from the design geometry.

Through the selection of the spring geometry, and thus of the spring constant, an elasticity can be selected that can be adapted optimally to the pressure sensor.

The pressure sensor can be provided in the immediate vicinity of the elastic element, or can acquire the movement of the glow element at another location.

Moreover, a sensor can be integrated into the elastic element so that the distortion of the elastic element can be acquired as a measure of the pressure in the combustion chamber.

In another specific embodiment, the glow element can be pre-stressed against the plug shell, and in a pressureless state there can exist an elastic deformation of the elastic element. This is removed or reduced under the action of pressure, and thus of force.

Further advantageous embodiments result from the following description, as well as the Claims.

DRAWING

DESCRIPTION OF THE EXEMPLARY EMBODIMENTS

Figure 1:
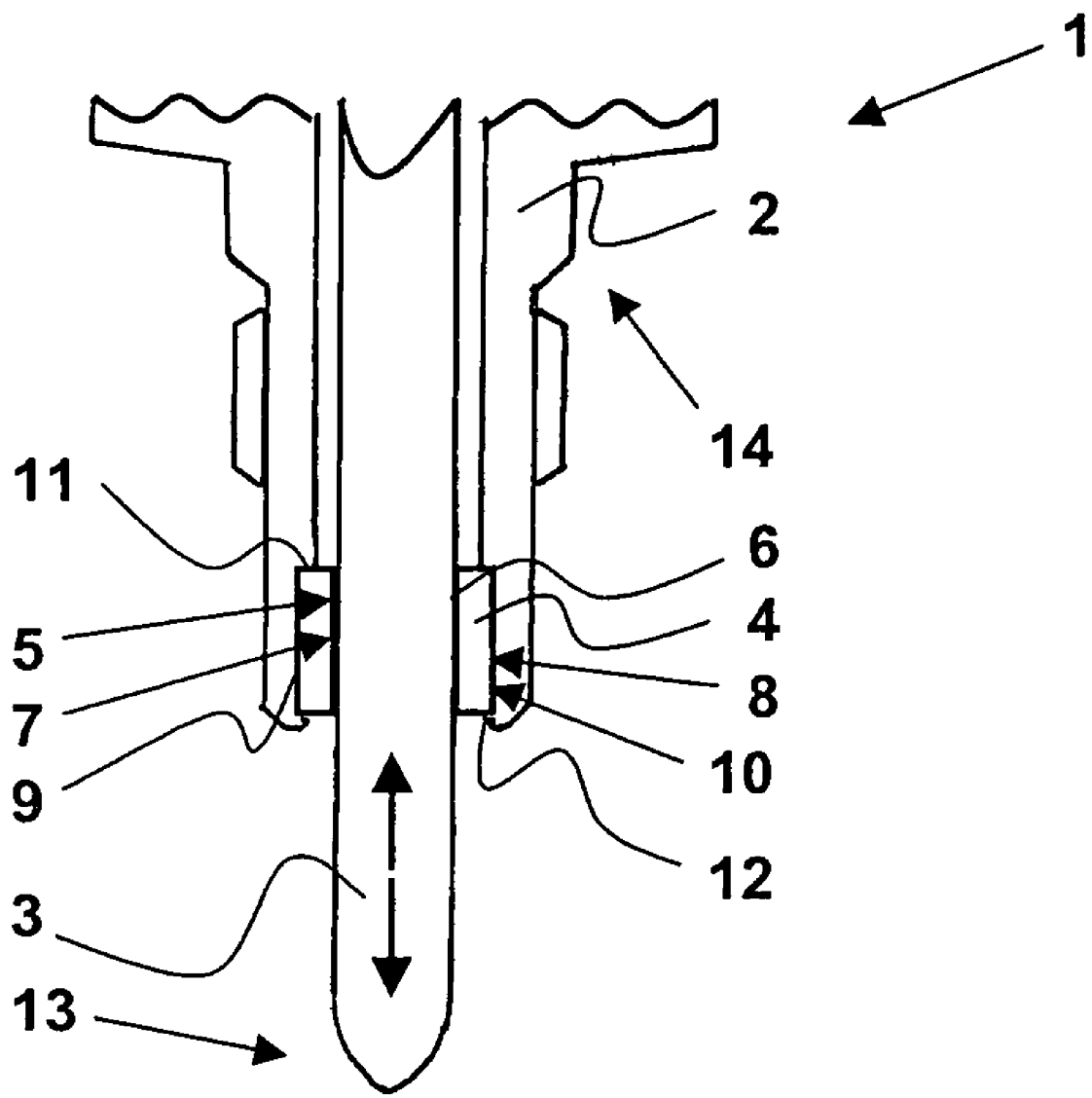
FIG. 1 shows a schematic representation of a first exemplary embodiment of the sheathed-element glow plug according to the present invention, in a partial section.

The present invention relates to a ceramic sheathed-element glow plug 1 as shown in FIGS. 1-5. It is made up of a plug shell 2 and a ceramic glow element 3.

Between plug shell 2 and glow element 3 there is situated an electrically conductive elastic element 4 that is fashioned in the form of an annular element. With its inner surface 5, it forms a surface contact 6 with a part of sheathed-element glow plug surface 7, and with its outer surface 8 it forms an additional surface contact 9 with a part of inner surface 10 of plug shell 2. Surface contacts 6, 9 ensure the electrical connection between plug shell 2 and glow element 3.

The deformability of the elastic element 4 has the result that when a force acts on sheathed-element glow plug 1, for example due to an increase in pressure in the combustion chamber (not shown in more detail in the Figure), glow element 3 can execute a movement relative to plug shell 2. The amount of the movement can be acquired by a sensor (also not shown in the Figure), and is used as a measure of the pressure present in the combustion chamber.

At the connection side, elastic element 4 is held in position by a support surface 11 attached to plug shell 2. At the combustion chamber side, a crimping 12 prevents elastic element 4 from sliding out of plug shell 2. During assembly, the elastic element can be pushed over glow element 3 and can be pressed from combustion chamber side 13 in the direction of connection side 14 against support surface 11; the fixing in place by means of crimping 12 takes place subsequently.

Figure 2:
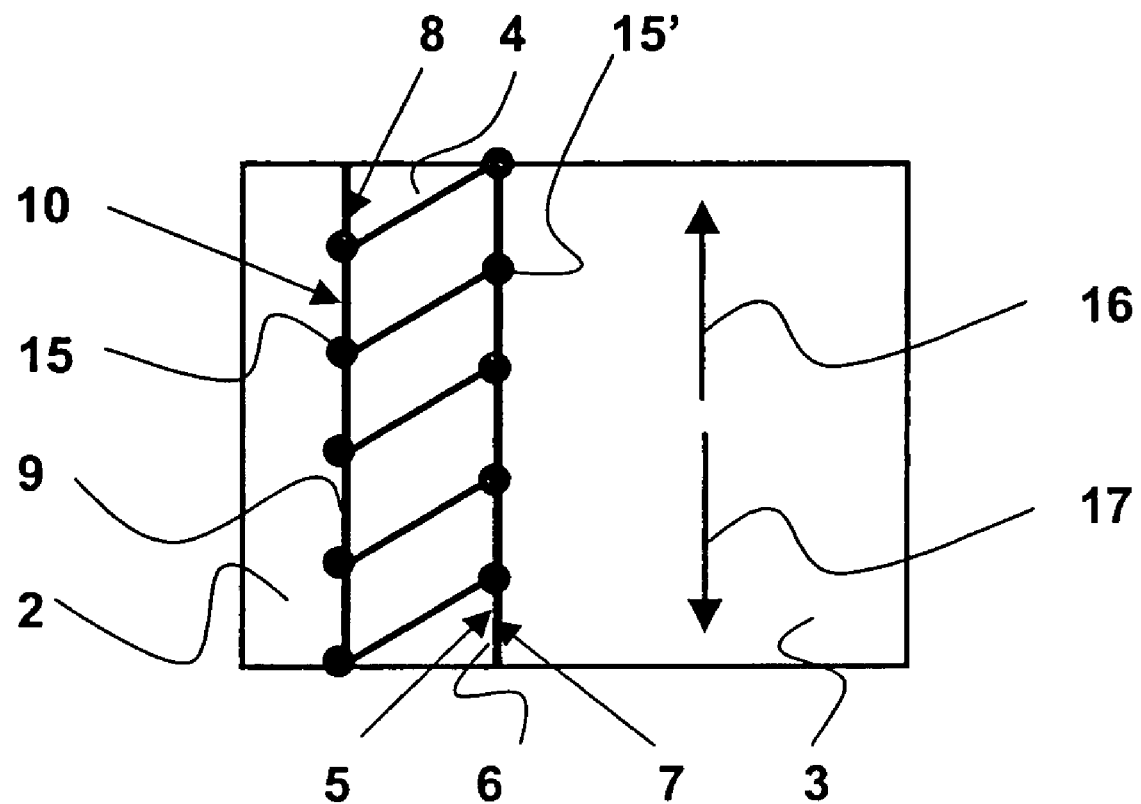
FIG. 2 shows a detail of the view according to FIG. 1.

FIG. 2 shows a detailed view of the section from FIG. 1. Depicted here are surface contacts 6, 9, on the one hand between outer side 8 of elastic element 4 and a part of inner surface 10 of plug shell 2, and on the other hand between inner surface 7 of elastic element 4 and a part of outer surface 5 of glow element 3. Without the external action of a force in the combustion chamber, corresponding contact points 15, 15' are situated opposite one another. However, if an increased pressure, and thus a force, acts on glow element 3 in connection direction 16, a shearing of the elastic element takes place, and corresponding contact points 15, 15' move towards one another. Surface contacts 6, 9 remain uninfluenced by this, so that a low-ohm connection is ensured between glow element 3 and plug shell 2.

If the external pressure subsides, so that a force is no longer acting, glow element 3 moves again in the direction of combustion chamber 17, and the corresponding contact points 15, 15' are again situated opposite one another (not shown in the Figure).

Figure 3:
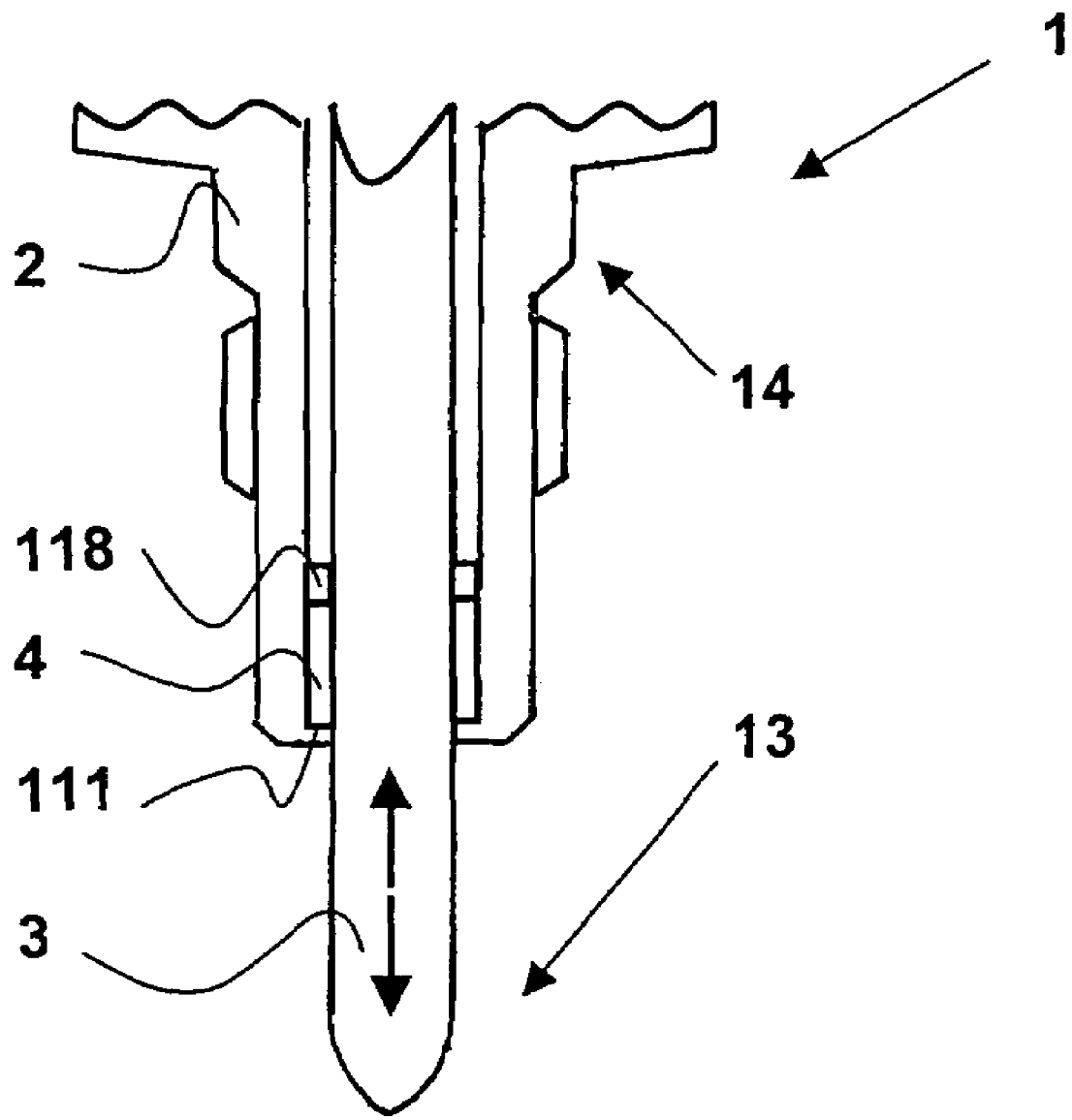
FIG. 3 shows a schematic representation of a second exemplary embodiment of the sheathed-element glow plug according to the present invention, in a partial section.

FIG. 3 shows a second exemplary embodiment of a sheathed-element glow plug 1 according to the present invention, having a plug shell 2, glow element 3, and elastic element 4, in a partial section.

In this example, elastic element 4 is held in position at the side of the combustion chamber by a support surface 111, and at the connection side a press ring 118 is provided in order to fix it in place.

During assembly, elastic element 4 is pressed from connection side 14 in the direction of combustion chamber side 13 against support surface 111, and is fixed by press ring 118.

Figure 4:
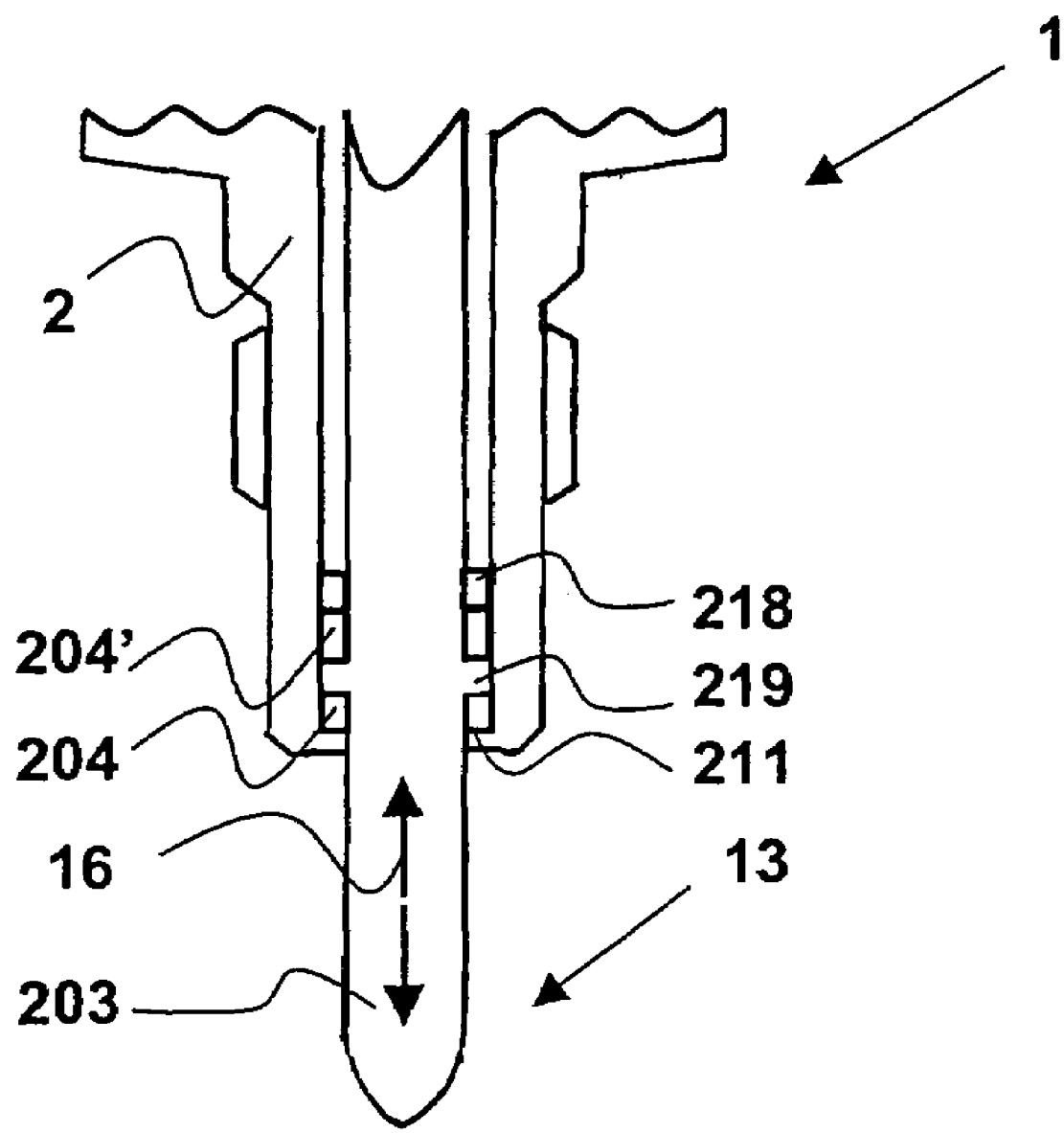
FIG. 4 shows a schematic representation of a third exemplary embodiment of the sheathed-element glow plug according to the present invention, in a partial section.

FIG. 4 shows a third exemplary embodiment of a sheathed-element glow plug 1 according to the present invention having a plug shell 2, a glow element 203, and elastic elements 204, 204', in a partial section.

In this example, glow element 203 has a radial projection 219. Glow element 203 stands in contact with plug shell 2 via projection 219 itself.

The depicted exemplary embodiment has two elastic elements 204, 204'. On combustion chamber side 13, the one elastic element 204 is situated on a support surface 211 on plug shell 2, and on the connection side it contacts projection 219 of glow element 203. On the combustion chamber side, second elastic element 204' is situated on projection 219 of glow element 203, and is fixed at the connection side by a press ring 218.

If, due to an external force, glow element 203 now moves in connection direction 16, the one elastic element 204' is compressed and the other elastic element 204 is stretched. A possible quantitative difference between the compression and the stretching of the elastic material is evened out in this way.

Figure 5:
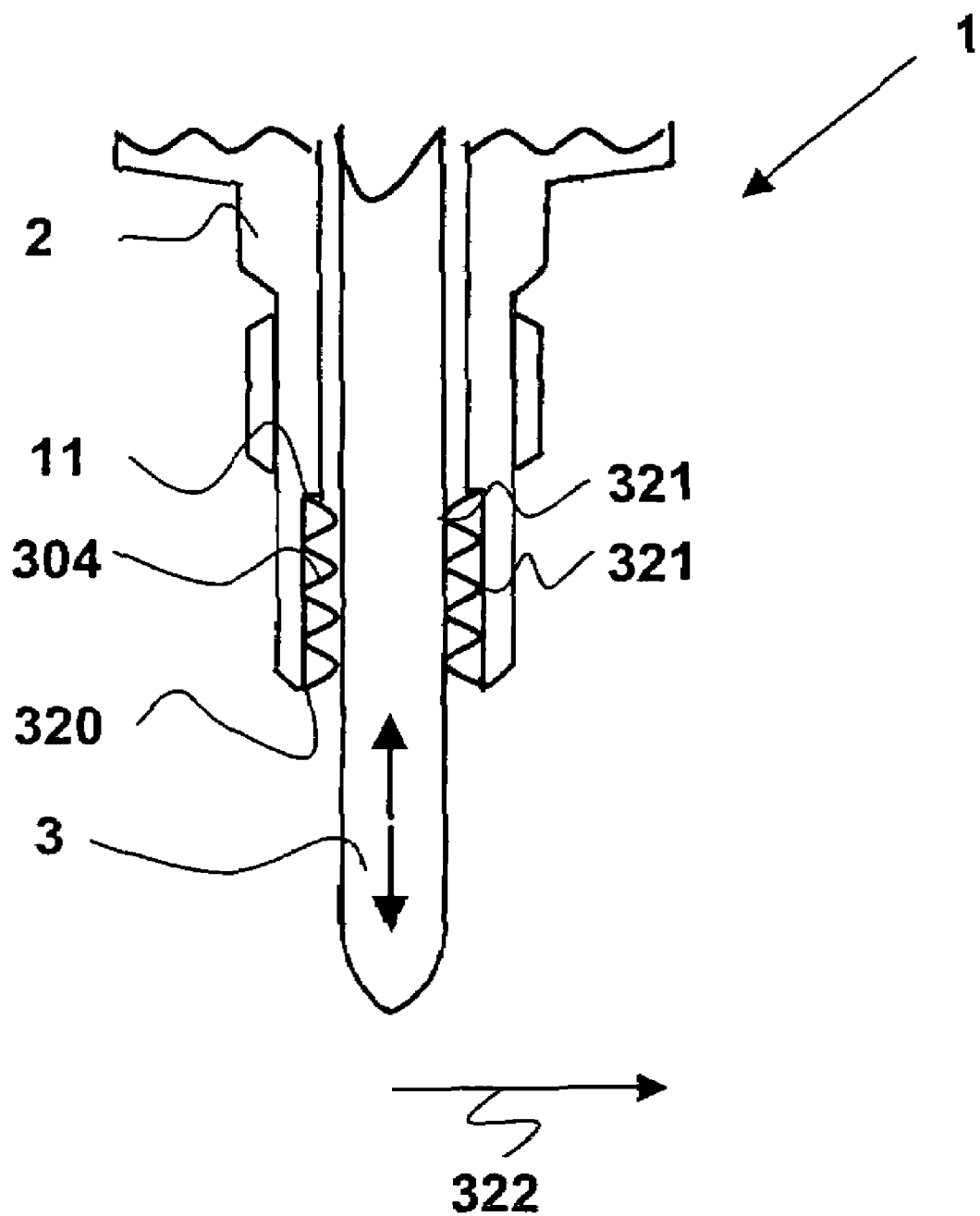
FIG. 5 shows a schematic representation of a fourth exemplary embodiment of the sheathed-element glow plug according to the present invention, in a partial section.

FIG. 5 shows another exemplary embodiment of a sheathed-element glow plug 1 according to the present invention, having a plug shell 2, a glow element 3, and an elastic element 304, in a partial section.

In this example, elastic element 304 is present in the form of a tension spring. At the connection side, this spring is situated on a support surface 11 attached in plug shell 2, and at the combustion chamber side the tension spring is fixed by a welding 320.

The contact between the tension spring and glow element 3 and plug shell 2 takes place not via surface contacts but rather only at a few contact points 321. However, the tension spring is designed in such a way that the spring action also acts in radial direction 322, so that a frictional connection is present between the tension spring and glow element 3, as well as between the tension spring and plug shell 2.

What is claimed is:

1. A sheathed-element glow plug for an internal combustion engine, comprising:
    a plug shell;
    a glow element electrically connected to the plug shell;
    an integrated pressure sensor; and
    at least one elastic element situated between an inner surface of the plug shell and the glow element, the elastic element forming an electrical contact both to a part of the inner surface of the plug shell and to a part of a surface of the glow element, the elastic element being deformable when a force acts on the glow element, the elastic element permitting a relative movement between the glow element and the plug shell.

2. The sheathed-element glow plug according to claim 1, wherein an adjustment of a position of the elastic element takes place via a support inside the shell.

3. The sheathed-element glow plug according to claim 1, wherein an adjustment of a position of the elastic element takes place via a press ring attached inside the shell.

4. The sheathed-element glow plug according to claim 1, wherein an adjustment of a position of the elastic element takes place via welding points attached to the shell.

5. The sheathed-element glow plug according to claim 1, wherein the at least one elastic element includes a plurality of elastic elements, and wherein the glow element has at least one radial projection on which the elastic elements are situated on both sides.

6. The sheathed-element glow plug according to claim 1, wherein the at least one elastic element includes a tension spring element.

7. The sheathed-element glow plug according to claim 1, wherein the pressure sensor is situated behind the glow element.

8. The sheathed-element glow plug according to claim 1, wherein the pressure sensor is situated next to the glow element.

* * * * *